United States Patent
Gao

(10) Patent No.: US 8,797,005 B2
(45) Date of Patent: Aug. 5, 2014

(54) BOOST CONVERTER

(75) Inventor: Xinming Gao, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 291 days.

(21) Appl. No.: 13/318,147

(22) PCT Filed: Jul. 4, 2011

(86) PCT No.: PCT/CN2011/076798
§ 371 (c)(1),
(2), (4) Date: Oct. 30, 2011

(87) PCT Pub. No.: WO2012/155382
PCT Pub. Date: Nov. 22, 2012

(65) Prior Publication Data
US 2012/0293152 A1    Nov. 22, 2012

(30) Foreign Application Priority Data

May 19, 2011   (CN) ........................ 2011 2 0161392 U

(51) Int. Cl.
    *G05F 1/10*      (2006.01)
(52) U.S. Cl.
    USPC ............................................ 323/222; 363/16
(58) Field of Classification Search
    USPC .............. 323/205, 207, 222, 225; 363/16–20,
              363/21.01, 21.05, 21.08, 37, 39, 40, 56.05,
              363/56.12, 97, 98, 132
    See application file for complete search history.

(56) References Cited

U.S. PATENT DOCUMENTS

| | | | | |
|---|---|---|---|---|
| 4,346,431 A | * | 8/1982 | Steigerwald | 363/27 |
| 4,734,636 A | * | 3/1988 | Stevens | 323/235 |
| 5,307,005 A | * | 4/1994 | Ahladas et al. | 323/222 |
| 5,550,458 A | | 8/1996 | Farrington et al. | |
| 5,604,422 A | * | 2/1997 | Peters | 323/222 |
| 5,793,190 A | * | 8/1998 | Sahlstrom et al. | 323/222 |
| 6,028,418 A | | 2/2000 | Jovanovic et al. | |
| 6,060,867 A | | 5/2000 | Farrington et al. | |
| 6,236,191 B1 | | 5/2001 | Chaffai | |
| 6,323,627 B1 | | 11/2001 | Schmiederer et al. | |
| 6,434,029 B1 | | 8/2002 | Cyr et al. | |
| 7,254,048 B2 | | 8/2007 | Lanni | |
| 7,385,833 B2 | * | 6/2008 | Keung | 363/56.12 |
| 7,855,471 B2 | | 12/2010 | Sugawara | |

FOREIGN PATENT DOCUMENTS

| | | |
|---|---|---|
| CN | 1956304 A | 5/2007 |
| CN | 101783588 A | 7/2010 |
| CN | 201656768 U | 11/2010 |

* cited by examiner

*Primary Examiner* — Rajnikant Patel
(74) *Attorney, Agent, or Firm* — Cheng-Ju Chiang

(57) ABSTRACT

A boost converter is disclosed in the present disclosure. The boost converter includes a switching element, a first diode, a second diode, a first inductor, a second inductor, a DC voltage input terminal and a DC voltage output terminal. The first inductor, the second inductor and the second diode are connected in sequence between the DC voltage input terminal and the DC voltage output terminal. The second diode has an anode connected to the second inductor and a cathode connected to the DC voltage output terminal. The switching element includes a first end, a second end and a third end for controlling connection or disconnection between the first end and the second end. The first end is connected between the first and the second inductor. The boost converter of the present disclosure is convenient to use and features high inductance coupling efficiency.

7 Claims, 3 Drawing Sheets

BOOST CONVERTER

FIELD OF THE INVENTION

The present disclosure generally relates to the technical field of voltage conversion, and more particularly to a boost converter.

BACKGROUND OF THE INVENTION

In operation of an electronic device, it is often necessary to boost a lower voltage level in order to power circuits requiring a higher voltage level. This boosting function is usually accomplished by a boost converter.

Referring to FIG. 1, a conventional boost converter is shown. The boost converter includes a direct current (DC) voltage input terminal Vin, a DC voltage output terminal Vout, a fuse F101, a first inductor L101, a second inductor L102, a switching power transistor Q101, a rectifying diode D101 and a filtering capacitor C102. The second inductor L102 and the first inductor L101 are coupling inductors, with a turn ratio of the second inductor L102 to the first inductor L101 being N.

The DC voltage input terminal Vin is connected to an anode of the rectifying diode D101 via the fuse F101, the first inductor L101 and the second inductor L102 in sequence. A cathode of the rectifying diode D101 is connected to the DC voltage output terminal Vout. The switching power transistor Q101 has a drain connected between the first inductor and the second inductor, a source connected to the ground GND, and a gate for receiving a drive signal DRV. The filtering capacitor C102 has one terminal thereof connected to the ground GND and the other terminal thereof connected to the DC voltage output terminal Vout.

The boost converter operates on the following principle.

When the switching power transistor Q101 is turned on, the first inductor L101 is charged by the DC voltage input terminal Vin to produce induced electromotive forces in the first inductor L101 and the second inductor L102. A voltage difference across the first inductor L101 is Vin, and a voltage difference across the second inductor L102 is N*Vin. Because the left terminal of the second inductor L102 is grounded, the voltage at the right terminal of the second inductor L102 is −N*Vin, i.e., the anode voltage of the rectifying diode D101 is −N*Vin.

When the switching power transistor Q101 is turned off, the first inductor L101 begins to be discharged and the voltage at the DC voltage output terminal Vout reaches a value of Vo, i.e., the cathode voltage of the rectifying diode D101 is Vo.

As can be known from the above description, the maximum voltage difference between the cathode and the anode of the rectifying diode D101 is equal to Vo+N*Vin, so the rectifying diode D101 must be able to withstand a voltage higher than Vo+N*Vin. Therefore, this boost converter has a high requirement on the voltage withstand capability of the rectifying diode D101, which imposes a limitation on choice of the rectifying diode D101.

Additionally, when the switching power transistor Q101 is turned on, the rectifying diode D101 is turned off because the voltage at the left terminal of the second inductor L102 is higher than that of the right terminal. In this case, the second inductor L102 cannot serve the function of storing energy because no current loop is formed therethrough. This makes the utilization factor of the inductor relatively low.

Accordingly, an urgent need exists in the art to provide a boost converter which can eliminate the limitation on choice of the components and can increase the utilization factor of the coupling inductors.

SUMMARY OF THE INVENTION

A primary objective of the present disclosure is to provide a boost converter that can eliminate the limitation on choice of the components and can increase the utilization factor of the coupling inductors.

To achieve this objective, the present disclosure provides a boost converter, which includes a switching element, a first diode, a second diode, a first inductor, a second inductor, a first capacitor, a direct current (DC) voltage input terminal and a DC voltage output terminal. The first inductor, the second inductor, the first capacitor and the second diode are connected in sequence between the DC voltage input terminal and the DC voltage output terminal. The second diode has an anode connected to the first capacitor and a cathode connected to the DC voltage output terminal. The switching element includes a first end, a second end and a third end for controlling connection or disconnection between the first end and the second end. The first end is connected between the first inductor and the second inductor, the second end is connected to a ground, and the third end is adapted to receive a drive signal. The first diode has a cathode connected to the anode of the second diode and an anode connected to the ground.

To achieve the aforesaid objective, the present disclosure further provides a boost converter, which includes a switching element, a first diode, a second diode, a first inductor, a second inductor, a DC voltage input terminal and a DC voltage output terminal. The first inductor, the second inductor and the second diode are connected in sequence between the DC voltage input terminal and the DC voltage output terminal. The second diode has an anode connected to the second inductor and a cathode connected to the DC voltage output terminal. The switching element includes a first end, a second end and a third end for controlling connection or disconnection between the first end and the second end. The first end is connected between the first inductor and the second inductor, the second end is connected to a ground, and the third end is adapted to receive a drive signal. The first diode has a cathode connected to the anode of the second diode and an anode connected to the ground.

Preferably, the boost converter further includes a first capacitor and a second capacitor. The first capacitor is connected between the second inductor and the anode of the second diode. The second capacitor has one terminal thereof connected to the DC voltage output terminal and the other terminal thereof connected to the ground.

Preferably, the boost converter further includes a third capacitor connected between the DC voltage input terminal and the ground.

Preferably, the boost converter further includes a current limiting resistor which has one terminal thereof connected to the anode of the first diode and the other terminal thereof connected to the ground.

Preferably, the switching element is a field effect transistor (FET), and the first end, the second end and the third end of the switching element are a drain, a source and a gate of the FET, respectively.

Preferably, the first inductor and the second inductor are coupling inductors, a dotted terminal of the first inductor is connected to the DC voltage input terminal, a non-dotted terminal of the first inductor is connected to a dotted terminal of the second inductor, and a non-dotted terminal of the second inductor is connected to the anode of the second diode.

As compared to the prior art, the boost converter of the present disclosure further includes a first diode which can clamp an anode voltage of the second diode to the ground when the switching element is turned on. Because this considerably decreases the withstood voltage of the second diode, components of the boost converter can be chosen conveniently at a lower cost. Furthermore, through disposition of the first diode, a current loop is formed through the second inductor when the switching element is turned on, and consequently, energy can be stored by the second inductor during the electric energy transmission process to improve the utilization factor of the second inductor. Accordingly, the boost converter of the present disclosure makes it convenient to choose the components and improves the utilization factor of the inductors.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF THE INVENTION

Figure 1:
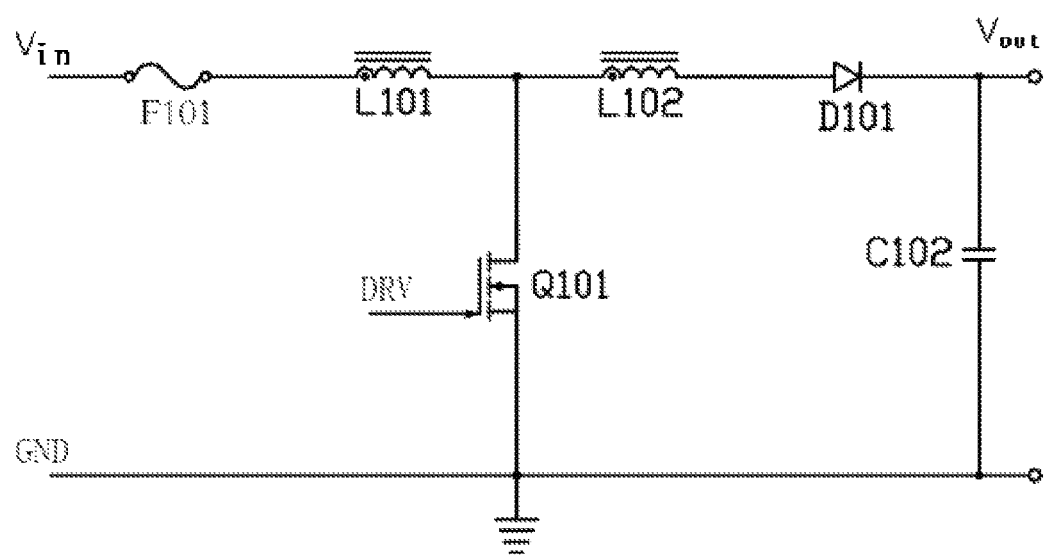
FIG. 1 is a schematic circuit diagram of a conventional boost converter.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Figure 2:
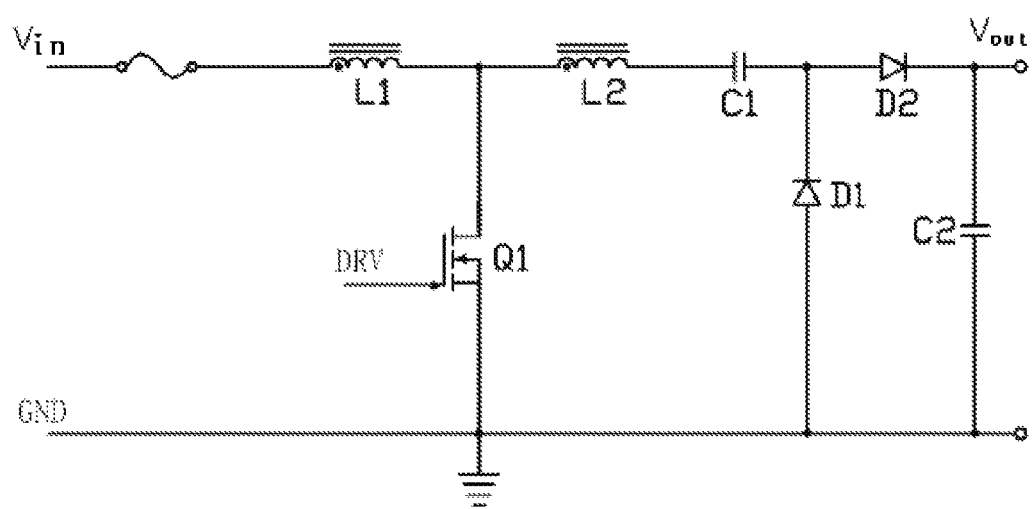
FIG. 2 is a schematic circuit diagram of a boost converter according to a first embodiment of the present disclosure.

Referring to FIG. 2, a schematic circuit diagram of a boost converter according to a first embodiment of the present disclosure is shown. The boost converter includes a direct current (DC) voltage input terminal Vin, a DC voltage output terminal Vout, a fuse (not labeled), a switching element Q1, a first diode D1, a second diode D2, a first capacitor C1, a second capacitor C2, a first inductor L1 and a second inductor L2.

The first inductor L1 and the second inductor L2 are coupling inductors. A dotted terminal of the first inductor L1 is connected to the DC voltage input terminal Vin via the fuse, while a non-dotted terminal of the first inductor L1 is connected to a dotted terminal of the second inductor L2. A non-dotted terminal of the second inductor L2 is connected to an anode of the second diode D2 via the first capacitor C1. A cathode of the second diode D2 is connected to the DC voltage output terminal Vout. The second diode D2 is a rectifying diode. The first diode D1 is a clamp diode having an anode connected to the ground GND and a cathode connected to the anode of the second diode D2. The second capacitor C2 is a filtering capacitor having a terminal thereof connected to the cathode of the second diode D2 and the other terminal thereof connected to the ground GND.

The switching element Q1 includes a first end, a second end and a third end for controlling connection or disconnection between the first end and the second end. The first end is connected to the dotted terminal of the second inductor L2, the second end is connected to the ground GND, and the third end is adapted to receive a drive signal DRV. The third end of the switching element Q1 controls connection or disconnection between the first end and the second end according to the drive signal DRV that is received.

Assuming that a turn ratio of the second inductor L2 to the first inductor L1 is N, then the boost converter operates on the following principle.

When the first end and the second end of the switching element Q1 are connected to each other, the first inductor L1 is charged by the DC voltage input terminal Vin to produce induced electromotive forces in the first inductor L1 and the second inductor L2. A voltage difference across the first inductor L1 is Vin, and a voltage difference across the second inductor L2 is N*Vin. Because the dotted terminal of the second inductor L2 is connected to the ground GND via the switching element Q1, the voltage at the non-dotted terminal of the second inductor L2 is −N*Vin. At this point, the anode voltage of the first diode D1 is higher than the cathode voltage of the first diode D1, so the first diode D1 is turned on to form a current loop through the second inductor L2, the first capacitor C1 and the first diode D1. Therefore, the second inductor L2 can also be charged when the switching element Q1 is turned on, which increases the coupling efficiency of the second inductor L2. The first capacitor C1 is used to filter out the DC component of this current loop to prevent overcurrent in the loop. Furthermore, because the first diode is turned on, the anode of the second diode D2 is clamped to the ground GND.

When the first end and the second end of the switching element Q1 are disconnected, the first inductor L1 and the second inductor L2 begin to be discharged and, correspondingly, the first rectifying diode D1 is turned off. At this point, the voltage at the DC voltage output terminal Vout is Vo=Vin+VL1+VL2, where VL1 represents a voltage difference across the first inductor L1 and VL2 represents a voltage difference across the second inductor L2.

As can be known from the above description, the maximum voltage difference between the cathode and the anode of the second diode D2 is Vo, so a withstand voltage higher than Vo will suffice for the second diode D2.

As compared to the prior art, the boost converter of the present disclosure further includes a first diode D1 which can clamp an anode voltage of the second diode D2 to the ground when the switching element Q1 is turned on. Because this considerably decreases the withstand voltage of the second diode D2, components of the boost converter can be chosen conveniently at a lower cost. Furthermore, through disposition of the first diode D1, a current loop is formed through the second inductor L2 when the switching element Q1 is turned on, and consequently, energy can be stored by the second inductor L2 during the electric energy transmission process to improve the utilization factor of the second inductor. Accordingly, the boost converter of the present disclosure makes it convenient to choose the components and improves the utilization factor of the inductor.

In this embodiment, the switching element Q1 is an N-type channel field effect transistor (NFET), and the first end, the second end and the third end of the switching element Q1 are a drain, a source and a gate of the NFET, respectively. Of course, a P-type channel field effect transistor (PFET) or other elements with the same functionality may also be adopted instead.

Figure 3:
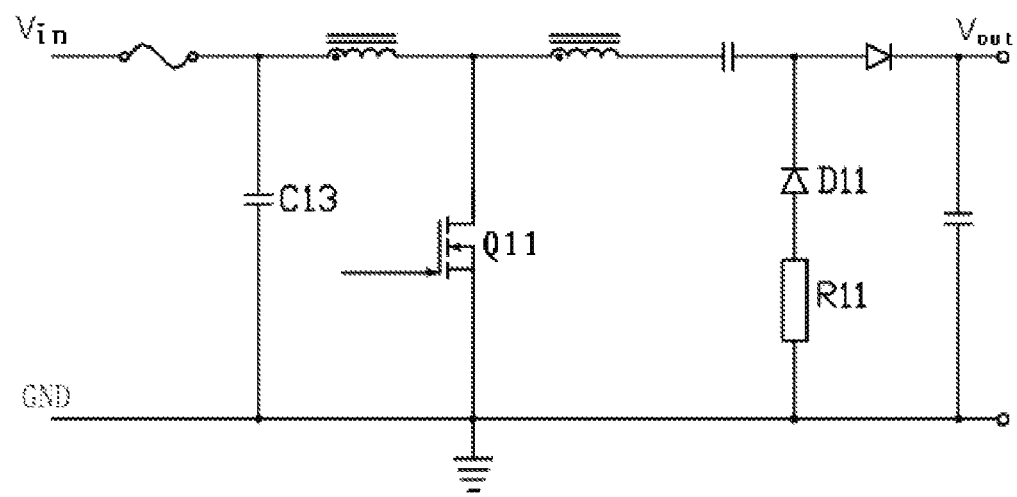
FIG. 3 is a schematic circuit diagram of a boost converter according to a second embodiment of the present disclosure.

Referring to FIG. 3, a schematic circuit diagram of a boost converter according to a second embodiment of the present disclosure is shown. The boost converter of the second embodiment is substantially the same as that of the first embodiment except that the boost converter of the second embodiment further includes a third capacitor C13 and a current limiting resistor R11. The third capacitor C13 functions as a filtering capacitor. One terminal of the third capacitor C3 is connected to a DC voltage input terminal Vin via a fuse, and the other terminal of the third capacitor C3 is connected to the ground GND. One terminal of the current limiting resistor R11 is connected to an anode of a first diode D11, and the other terminal of the current limiting resistor R11 is connected to the ground GND.

The third capacitor C13 is used to filter out noises in a voltage input from the DC voltage input terminal Vin. The current limiting resistor R11 is used to limit the current when the switching element Q11 is turned on so as to improve the safety and durability of the boost converter.

Both the boost converter of the first embodiment and the second embodiment may be used in circuits of a liquid crystal display (LCD) device to boost a DC voltage.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A boost converter, comprising a switching element, a first diode, a second diode, a first inductor, a second inductor, a first capacitor, a direct current (DC) voltage input terminal and a DC voltage output terminal, wherein the first inductor, the second inductor, the first capacitor and the second diode are connected in sequence between the DC voltage input terminal and the DC voltage output terminal, the second diode has an anode connected to the first capacitor and a cathode connected to the DC voltage output terminal, the switching element comprises a first end, a second end and a third end for controlling connection or disconnection between the first end and the second end, the first end is connected between the first inductor and the second inductor, the second end is connected to a ground, the third end is adapted to receive a drive signal, and the first diode has a cathode connected to the anode of the second diode and an anode connected to the ground; wherein when the first end and the second end of the switching element are connected to each other, the first diode is turned on to form a current loop through the second inductor, the first capacitor and the first diode, such as to charge the second inductor and clamp an anode voltage of the second diode to the ground.

2. A boost converter, comprising a switching element, a first diode, a second diode, a first inductor, a second inductor, a direct current (DC) voltage input terminal and a DC voltage output terminal, wherein the first inductor, the second inductor and the second diode are connected in sequence between the DC voltage input terminal and the DC voltage output terminal, the second diode has an anode connected to the second inductor and a cathode connected to the DC voltage output terminal, the switching element comprises a first end, a second end and a third end for controlling connection or disconnection between the first end and the second end, the first end is connected between the first inductor and the second inductor, the second end is connected to a ground, the third end is adapted to receive a drive signal, and the first diode has a cathode connected to the anode of the second diode and an anode connected to the ground; wherein when the first end and the second end of the switching element are connected to each other, the first diode is turned on to form a current loop through the second inductor and the first diode, such as to charge the second inductor and clamp an anode voltage of the second diode to the ground.

3. The boost converter of claim 2, further comprising a first capacitor and a second capacitor, wherein the first capacitor is connected between the second inductor and the anode of the second diode, and the second capacitor has one terminal thereof connected to the DC voltage output terminal and the other terminal thereof connected to the ground.

4. The boost converter of claim 3, further comprising a third capacitor connected between the DC voltage input terminal and the ground.

5. A boost converter, comprising a switching element, a first diode, a second diode, a first inductor, a second inductor, a direct current (DC) voltage input terminal and a DC voltage output terminal, wherein the first inductor, the second inductor and the second diode are connected in sequence between the DC voltage input terminal and the DC voltage output terminal, the second diode has an anode connected to the second inductor and a cathode connected to the DC voltage output terminal, the switching element comprises a first end, a second end and a third end for controlling connection or disconnection between the first end and the second end, the first end is connected between the first inductor and the second inductor, the second end is connected to a ground, the third end is adapted to receive a drive signal, and the first diode has a cathode connected to the anode of the second diode and an anode connected to the ground;

wherein the boost converter further comprises a first capacitor and a second capacitor, wherein the first capacitor is connected between the second inductor and the anode of the second diode, and the second capacitor has one terminal thereof connected to the DC voltage output terminal and the other terminal thereof connected to the ground;

the boost converter further comprises a third capacitor connected between the DC voltage input terminal and the ground; and the boost converter further comprises a current limiting resistor which has one terminal thereof connected to the anode of the first diode and the other terminal thereof connected to the ground.

6. The boost converter of claim 2, wherein the switching element is a field effect transistor (FET), and the first end, the second end and the third end of the switching element are a drain, a source and a gate of the FET, respectively.

7. The boost converter of claim 2, wherein the first inductor and the second inductor are coupling inductors, a dotted terminal of the first inductor is connected to the DC voltage input terminal, a non-dotted terminal of the first inductor is connected to a dotted terminal of the second inductor, and a non-dotted terminal of the second inductor is connected to the anode of the second diode.

* * * * *